Oct. 21, 1969       G. F. CAREY ETAL       3,473,360
          ACOUSTIC TURBULENT WATER-FLOW TUNNEL
Filed Jan. 25, 1968                        2 Sheets-Sheet 1
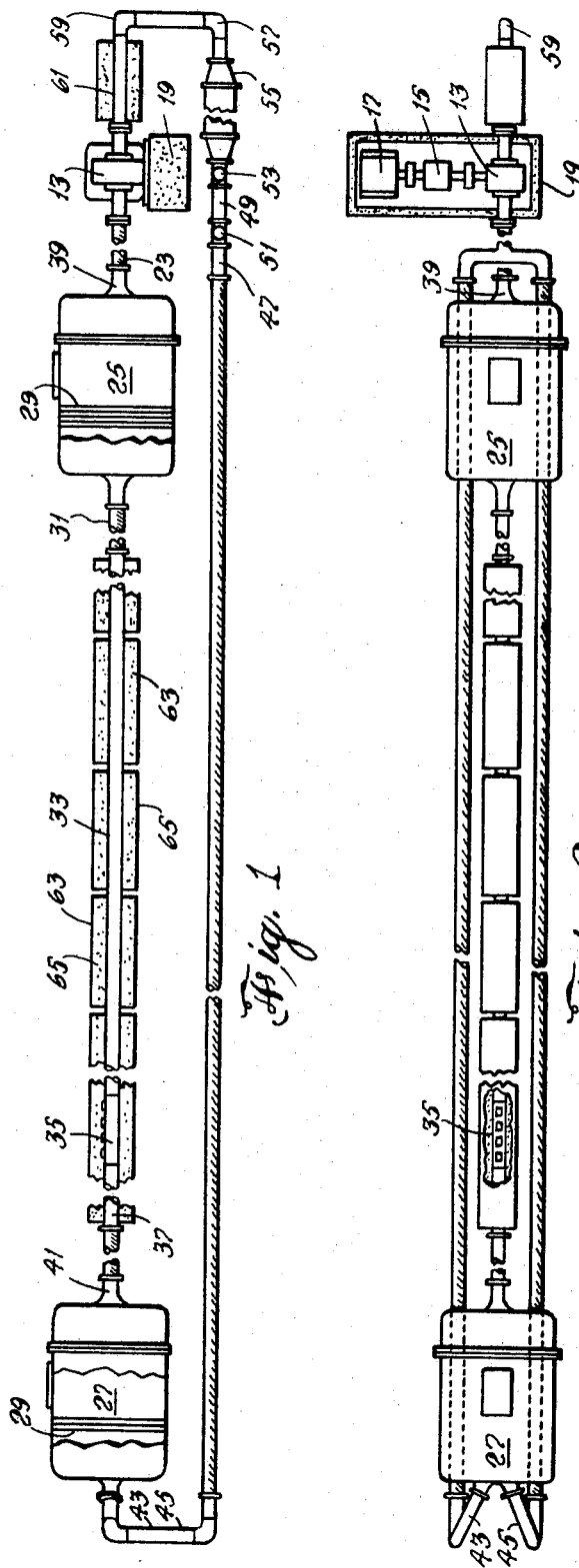
INVENTORS.
GEORGE F. CAREY
JOHN E. CHLUPSA
HOWARD H. SCHLOEMER
EMANUEL F. KING
BY
ATTORNEY Oct. 21, 1969    G. F. CAREY ET AL    3,473,360
ACOUSTIC TURBULENT WATER-FLOW TUNNEL
Filed Jan. 25, 1968    2 Sheets-Sheet 2

INVENTORS.
GEORGE F. CAREY
JOHN E. CHLUPSA
HOWARD H. SCHLOEMER
EMANUEL F. KING
BY
ATTORNEY 3,473,360
ACOUSTIC TURBULENT WATER-FLOW TUNNEL
George F. Carey, Waterford, and John E. Chlupsa and Howard H. Schloemer, New London, and Emanuel F. King, Stonington, Conn., assignors to the United States of America as represented by the Secretary of the Navy
Filed Jan. 25, 1968, Ser. No. 700,648
Int. Cl. G01m 9/00; F02m 35/00
U.S. Cl. 73—148                                                4 Claims

ABSTRACT OF THE DISCLOSURE

An acoustic turbulent water-flow tunnel having a clear plastic pipe test section through which water is pumped at centerline velocities of 9–48 knots, wherein noise-reduction means prevent pump and piping noises from entering the test section through structural or fluid paths.

---

The invention described herein may be manufactured and used by or for the Government of the United States of America for governmental purposes without the payment of any royalties thereon or therefor.

Background of the invention

In the process of determining the effect of compliant coatings on the measured pressure fluctuations produced by turbulent water-flow over falling bodies, it became apparent that there was a need for an acoustically quiet water tunnel for continuing fundamental investigations into the nature of turbulent flow and flow-induced noise under more completely controlled conditions, for the testing and calibration of hydrophones, and for like purposes.

Description of the prior art

Considerable research effort has been expended to develop noise-reduction techniques for liquid piping systems generally. None of these developments have been correlated and associated in a manner effective to accomplish the ends herein defined.

Summary

The general purpose of this invention is to provide means for acoustic measurements of turbulent boundary-layer-pressure fluctuation in a high speed, pump driven water tunnel, utilizing a closed loop system including neoprene screens, butyrate plastic pipe and nylon-reinforced fire hose and sand-box damping components to reduce acoustic interferences. Turbulent flow measurement in frequency regions where acoustic interference heretofore prevented work is also afforded, and the effects of wall roughness and hydrophone size, shape and location are brought within range of treatment.

Other objects and many of the attendant advantages of this invention will be readily appreciated as the same becomes better understood by reference to the following detailed description when considered in connection with the accompanying drawings, in which like reference numerals designate like parts throughout the figures thereof and wherein FIG. 1 is a diagram of an acoustic turbulent water flow tunnel, showing an elevation view of a preferred embodiment of the invention;

FIG. 2 is a plan view of FIG. 1;

Description of a preferred embodiment

Figure 4:
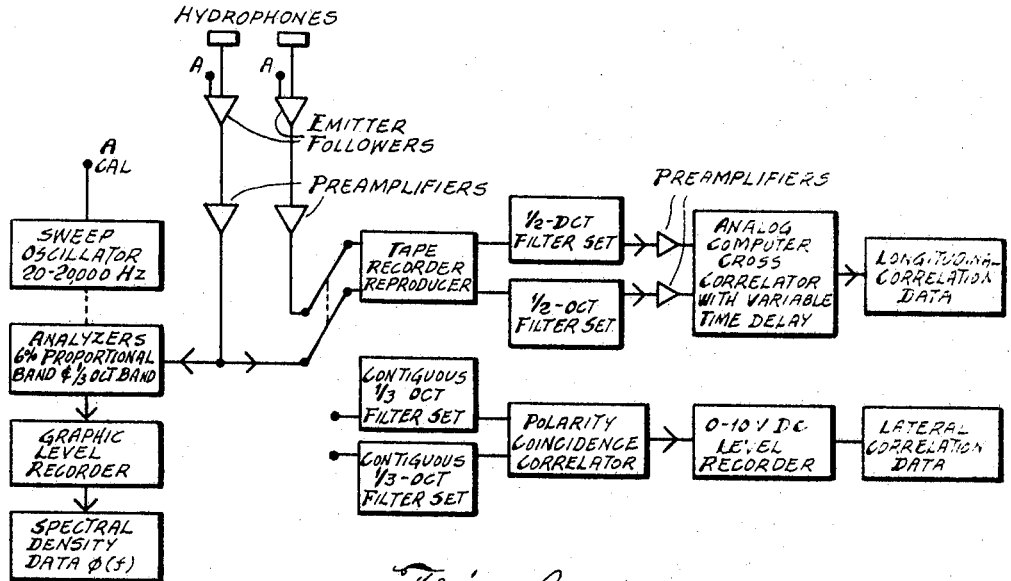
FIG. 4 is a block diagram of preferred instrumentation associated with the device.

As shown in FIG. 1, the acoustic turbulent water flow tunnel is a closed loop system having a clear-plastic test section 11, preferably about three and one half inches inside diameter. Water is pumped through this section at controlled center-line velocities ranging from approximately fifteen to eighty feet per second, or nine to forty eight knots. Water velocity and temperature are controlled automatically by any suitable system, such as that of Minneapolis-Honeywell.

To attain eighty feet per second in the test section while keeping the pump 13 (1520 g.p.m. centrifugal), fluid clutch 15 and motor 17 (125 H.P. induction motor—1770 r.p.m.) to a reasonable size, the remainder of the tunnel is characterized by low static-pressure loss. Acoustic and vibrational considerations, of course, impose additional restraints on parameters selected.

The pump was selected on the basis of delivering sufficient flow to obtain a 30 knot mean velocity in the test section and overcoming the pressure losses in the tunnel. No acoustic considerations were involved in the selection of the pump, as other parts of the system reduce the noise output. The pump system is mounted on a 9000 pound concrete block 19 anchored to the concrete floor to provide a firm, motion free foundation.

Because of the size of the motor, the fluid clutch speed control 15 was chosen instead of an AC electrical control system. Flow control by means of varying the pump speed was selected instead of throttling because a throttle valve would create extra noise at the lower pump speeds.

The water flow, upon leaving the single-stage, double suction 8X8X17 centrifugal pump 13, contracts as it passes from the eight inch diameter pump outlet 21 to the six inch diameter fire hose 23. This nylon reinforced rubber hose 23 further reduces unwanted pump vibrations and noise. Nylon reinforced rubber hose (hard suction hose) was used to reduce structural vibrations from the pump. The usual steel reinforced hose is not suitable for this purpose because it allows a structure borne path. This hard suction hose also acts as an attenuator of sound, as its wall is somewhat compliant when compared to a metal wall. Although there are no measurements as to the magnitude of this effect for the hose used, it has been documented for softer rubber hoses. Hard suction hose was used in the places indicated because it prevented structure borne vibrations from reaching the test section and served as an attenuator of acoustic noise.

The flow then enters the upstream plenum chamber 25 which is, preferably, five feet long and four feet in diameter. Here the velocity is quite low, ~½% of that in the test section.

Attenuation characteristics of the downstream plenum chamber 27 and the upstream plenum chamber 25 were calculated by considering them as simple expansion chambers with perfectly absorbing terminations, as defined in "Noise Reduction" by L. L. Beranek (McGraw-Hill Book Co., Inc., New York, 1960) Chapter 17. The first transmission-loss peak was 29 db at about 250 Hz. with nulls at zero and 500 Hz.; at 60 and 440 Hz., the transmission loss was about 20 db. (Some loss in acoustic energy was expected, since the plenum chambers act as reactive mufflers, although their structure was based on hydrodynamic rather than acoustic considerations.)

Figure 3:
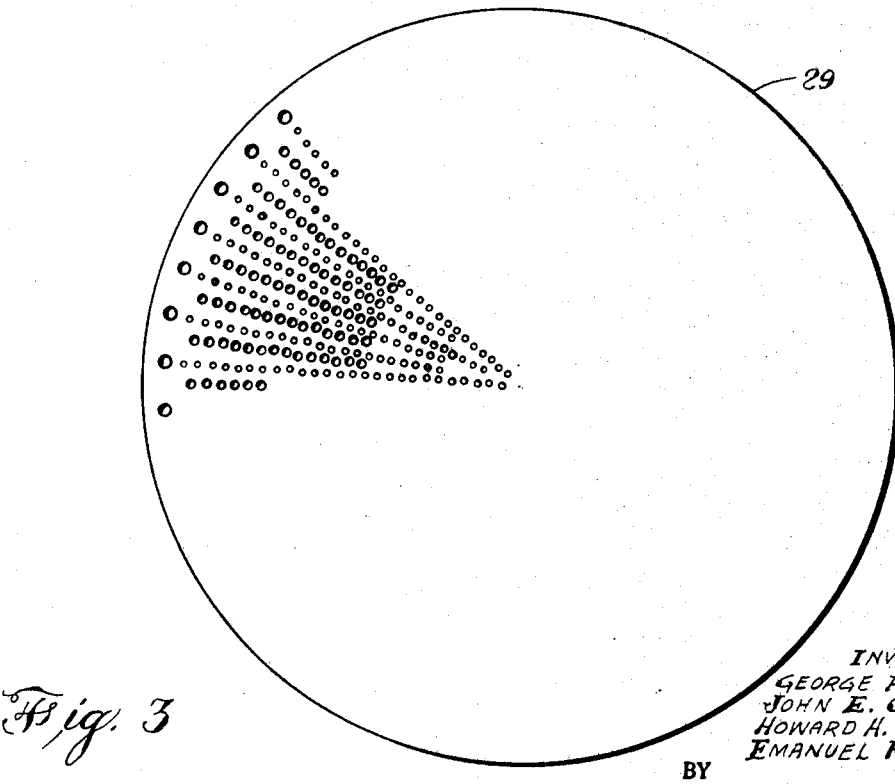
FIG. 3 is an elevation of a neoprene screen used in multiple arrays in the plenum chambers.

To provide further noise reduction, eight neoprene screens 29 were mounted in the plenum chambers, five in the aft portion of the upstream plenum chamber 25 and three in the aft portion of the downstream plenum chamber 27. The screens 29 were spaced three inches apart, and the first screen in each chamber is placed 46 inches from the chamber entrance. These screens were fabricated from MIL SPEC MIL-R-900 Class 1 (neoprene) and have a durometer of 30. Each screen is 3/8 inch thick, 47 3/4 inches in diameter and perforated with 2569 holes of 3/16 inch diameter and 1440 holes of 3/8 inch diameter, arranged with a cluster of the smaller holes near the center of the screen and with the two sizes of holes in alternating radial rows over the balance of the screen, as shown in FIG. 3. Flow irregularities and large scale fluctuations produced by the assymetric jet influx from the fire hose sections are dissipated by the 4009 holes in each screen. The high solidity of the screens and their relatively large holes could produce a high turbulent intensity. The large contraction ration of 64:1 of the water flowing from the upstream plenum chamber to another six inch diameter fire hose 31 reduces this intensity considerably, especially that of the longitudinal component in the six inch hose. (This effect has been shown experimentally by M. S. Uberoi in "Effect of Wind Tunnel Contraction on Free Stream Turbulence," J. Aeron. Sci. 23, 754–764 (1956)). The screens 29 also provide acoustic reduction of pump noise.

The upstream plenum chamber is used to dampen the severe flow fluctuations emitted from the pump. To accomplish this a large expansion ratio is required to reduce the mean longitudinal velocity to a low level to eliminate these fluctuations. Further reductions in these large scale disturbances is accomplished by the neoprene screens. These screens then serve two purposes: (1) To eliminate most of the acoustic noise, (2) Dampen large scale velocity fluctuations. The diameter of the plenum tank was chosen as 4 feet so that a very large expansion ratio 64 to 1 (referenced to the 6 inch entire diameter) could be obtained.

Another reason for the 4 foot diameter was the use of the tank as a reactive muffler (expansion chamber). A large expansion ratio increases the sound attenuation of a reactive muffler. The upper limit of the plenum chamber was controlled by three factors:

(1) Physical size; since the upstream and downstream connecting pipes were located at approximately table level from the floor the lateral dimension of the plenum could not be increased much, without extra cost in building up the floor, and pump foundation or construction of a pit in which to place the plenum. If the plenum were in a pit this would complicate the drainage problem.

(2) Pressure requirements. The entire system is designed to take 125 p.s.i.g. internal pressure and making the plenum tanks larger would require thicker tanks and end cap walls.

(3) As the lateral size of the tank is increased, higher order modes of propagation of the sound waves entering the chamber will occur. This will nullify the higher frequency attenuation characteristics of the plenum chamber and permit more noise to be propagated into the test section.

Length of the plenum chamber was based on both hydrodynamic and acoustic considerations. To place the five screens in the upstream chamber and still have sufficient volume to reduce the large scale disturbances a length of more than 4 feet was advisable. Acoustically, a length of 5 feet would have maximum attenuation at 250 Hz. and zero attenuation at 0 and 500 Hz. This would reduce the noise produced by the higher harmonics of the pump rotational speed. Top pump speed is 30 rev. per second and with a seven vaned impeller high noise levels are expected at 210 and 420 Hz. These computed performance characteristics are valid only for an ideal filter with plane waves entering and leaving and perfectly absorbing terminations. Thus a very simple design method was used as it is almost impossible to compute accurately the attenuation characteristics of the complete physical system.

The downstream plenum served to terminate the high velocity flow and provided a simple way of reversing its direction without large losses in stagnation pressure. Its design was based on the same considerations outlined previously for the upstream plenum chamber.

According to R. M. Hoover, D. T. Laird and L. N. Miller in "Acoustic Filter for Water Filled Pipes," J. Acoust, Soc. Am. 22, 38–44 (1950), the theoretical attenuation due to the 3/16 inch diameter holes in each screen is ~ 80 db in the frequency range 0–20,000 Hz. and ~40 db for the 3/8 inch diameter holes within the same frequency range. Although these large predicted values of attenuation were not expected to be realized in the tunnel, neoprene screens were selected over other attenuating devices because they were smaller, relatively inexpensive, hydrodynamically acceptable, and provided no unusual fabrication or installation problems.

After leaving the upstream plenum chamber 25, the flow passes through another section of six inch diameter fire hose 31 to reduce further vibration and noise from the pump system. Then the flow enters the long section of butyrate plastic pipe 33, which was selected because of its superior damping qualities.

In acoustic tests on a 21 foot long 2.055 inches inside diameter 2.390 inches outside diameter butyrate plastic pipe, the velocity of sound propagation through a water column in such a pipe was measured and found to be approximately 1080 feet per second as compared to 4500 and 1650 feet per second for steel and Plexiglas pipes respectively. By applying Korteweg's formula ("Development of Noise Measurement Techniques and Procedures for Use in Fluid Piping Systems," Rept. No. F-123-1, Conesco, Inc., Cambridge, Mass. (April 1964)), the velocity of sound expected in the 3½ inches inside diameter by 4½ inches outside diameter butyrate plastic pipe was 1360 feet per second. The first-column resonance based on this velocity for a 55 foot length of plastic pipe is 12.4 Hz. Tests were also conducted to determine the acoustic-dissipation characteristics of the 2.055 inches inside diameter butyrate plastic pipe. The indicated attenuation was between 1.6 and 2.3 db per wavelength foot, which is highly dissipative when compared with metallic pipes that are in the order of 0.1 db or less per wavelength foot. It was expected that the butyrate pipe would be excellent for preventing column resonance buildup of any elastic noise. A tolerance of 0.0005 inch, which is in the order of viscons sublayer thickness, is maintained between mating joints in the length of plastic pipe.

The acoustic test section 35 is a clear plastic section located 120 pipe diameters downstream of the pipe inlet. This is a greater length-to-diameter ratio than was heretofore considered necessary for assuring fully developed turbulent flow.

To eliminate the noise produced by flow separation, a 10° cone-angle diffuser 37 is used downstream of the test section 35. Diffusion of the flow entering the upstream plenum chamber 25 and the downstream plenum chamber 27 was accomplished with 20° cone angle diffusers 39 and 41 respectively. Since it was necessary to maintain only axially symmetric flow when accelerating the stream, all flow contractions were made using the same geometry as that for the diffusers.

The downstream plenum chamber 27 is similar in construction to the one upstream, except that it contains only three neoprene screens. This chamber serves as an acoustic filter and prevents pump and heat exchanger noise from reaching the test section 35. Two six inch diameter fire hoses 43 and 45, each 86 feet in length, extend from the aft end of this chamber and are used as return lines to reduce the static pressure loss and provide further acoustic and vibration attentuation.

After the flow passes through the return lines, it runs through a Y connector 47 and then into an 8 inch diameter pipe 49 into which a 40μ filter can be inserted.

A 40μ filter was used in the system to remove small particles from the water. This size was a compromise between filter pore size and pressure drop through the system. A smaller pore size would result in a larger pressure drop through the filter. Pressure drop for the system was a critical parameter as it determined the size of the pump and motor for a given flow rate. A larger pump would produce more noise and make it more difficult to reduce this noise in the test section.

Ball valves 51 and 53 on each side of the filter allow it to be replaced with a pipe of equivalent length without draining the water from the entire system. Downstream of the filter there is a single-pass, counterflow, shell and tube heat exchanger 55 that uses water as the coolant. The heat exchanger is rated at 382,000 B.t.u./h. for a 0.5° F. temperature difference. This is above the maximum energy absorption of the closed loop system, which is 319,000 B.t.u./h., assuming adiabatic conditions.

A heat exchanger was used as part of the system on the basis of the heat build up due to the friction factor, entrance and exit contractions, pipe valves and fitting losses and possible heat pick up from high ambient room temperatures.

By means of the heat exchanger and Minneapolis-Honeywell controls, water temperature is controlled automatically in the normal range of 60°–85° F. It also can be controlled outside of this range. From the heat exchange 55, the flow passes through two 90° elbows 57 and 59, enters a straight run of 8 inch pipe 61, which provides good suction conditions for the pump, and then completes the loop.

Further damping was effected by encasing a major portion of the pipe 33 between the plenum chambers in boxes 63 containing a fine dry sand 65, the pipe being cradled and buried in such sand. The sand used is any type that will not tend to cake and compact in such use.

To insure proper functioning of the tunnel, measurements of some of the more important properties of the turbulent boundary layer were made:

The universal velocity profile for the eight velocities that encompass the entire flow range was prepared. The center-line velocity at the test section of 16.5–80.4 feet per second gave the line a slope of 5.75 log 10 $U^*y/v+5.5$ (which is the same as for a Schlichting-smooth pipe, where $U^*$ is shear velocity $$\left(\left[\frac{\text{wall shearing stress}}{\text{density of fluid}}\right]^{1/2}\right)$$

$y$ is the distance from the wall at the velocity measurement section and $v$ is kinematic viscosity. Shear velocity was measured by computing the friction factor for the wall static-pressure differential in a 16½ ft. section of the pipe that also included the test section. Velocities were measured using a total head probe and wall static taps.

A total head probe was made of 3/16 inch diameter stainless steel tubing. A ½ inch long section of stainless-steel tubing with a 0.042 inch outside diameter and 0.009 inch thick wall was soldered to the 3/16 inch tube 5½ inches from one end. The total length of the probe was 18 inches. This arrangement produced a probe that was supported at both ends in the 3½ inch diameter pipe, as opposed to the more conventional cantilevered type. Because of the high dynamic pressures encountered and the necessity for maintaining a small frontal area perpendicular to the flow, the simply supported probe was used. The universal velocity profile measurement accuracy was approximately ±2%.

Pressure fluctuation measurements were made using Atlantic Research Corp. model LD 107–M hydrophones mounted flush with the inside pipe wall of the test section.

The hydrophones were calibrated using both a Bruel and Kjaer type 4220 piston phone, which is valid up to 800 Hz., and by comparison with a known standard. By mounting the test and standard hydrophones side by side in a turbulent air-flow tunnel (H. P. Bakewell, G. F. Carey, J. J. Libuha, H. H. Schloemer, and W. A. Von Winkle, "Wall Pressure Correlations in Turbulent Pipe Flow," U.S. Navy Underwater Sound Lab. Rept. No. 559 (Aug. 20, 1962)) and comparing frequency spectra, a calibration of up to 20 kHz. was obtained. The piston-phone calibration was accurate to within ±0.1 db, and the comparison method was accurate to within ±1 db.

A method developed by R. B. Gilchrist and W. A. Strawderman ("Experimental Hydrophone-Size Correction Factor for Boundary-Layer Pressure Fluctuations," J. Acoust. Soc. Am. 38, 298–302 (1965)), the tap test, was used to determine the effective area of the hydrophones. The effective diameter of the hydrophones was about 0.070 inch and was used for making corrections for finite hydrophone size, as proposed by G. M. Corcos, "Resolution of Pressure in Turbulence," J. Acoust. Soc. Am. 35, 192–199 (1963).

Each instrumentation channel (FIG. 3) was frequency calibrated and showed that the system response was linear and flat for 40–20,000 Hz. and within ±3° of being in phase throughout the frequency band.

The acceleration measurements indicated that the apparent acoustic spectrum levels due to acceleration of the hydrophones were in the ranges of 70 and 27 db below the measured wall pressure fluctuation spectrum at the low and high frequencies, respectively. Hence, the test section was effectively isolated from extraneous vibrations.

Spectral density measurements which showed good agreement with those of Bakewell et al., (U.S. Navy Underwater Sound Lab. Rept. No. 559) were made in 6% bands for the following velocities and broad frequency bands:

| Centerline velocity (ft./sec.) | Frequency band (Hz.) | Signal-to-ambient noise ratio (db) |
|---|---|---|
| 8.5 | 200–4,000 | 192 |
| 5.7 | 200–8,000 | 315 |
| 0.4 | 200–10,000 | 358 |

The signal-to-ambient noise ratio was greater at the lower frequencies for the three velocities investigated. Ambient noise, as used here, is the signal measured at the output of the transducer amplification system when the tunnel is not operating. It should, therefore, not be confused with the background noise that exists when the tunnel is operating.

The spectral measurements (uncorrected for finite transducer size) continued to fall off rapidly after 10,000 Hz. at all velocities, but when corrected for transducer size, as per Corcos, (J. Acoust. Soc. Am. 35, 192–199 1963) the corrected spectral density curve had an inflection point beyond which it tended to flatten out. There are two possible explanations for this: (1) the size corrections of up to 30 db are unrealistically large or (2) the presence of extraneous background noise. Appearance of the inflection point served to terminate the data at the upper frequency listed previously for each velocity.

Selection of 200 Hz. as the lower cutoff frequency was based on longitudinal cross-correlation measurements down to 90 Hz., which indicated a highly uncorrelated background noise.

Convection velocities were measured in ½-oct. bands from 250–4000 Hz. and with hydrophone spacings ranging from 0.214–0.800 in. The results show a decrease in convection velocity with increased frequency and a slight increase of convection velocity with greater hydrophone spacing.

Operation of the apparatus, by mounting a selected hydrophone or hydrophones in the test section and coupling such hydrophones to the instrumentation of FIG. 4, is well understood. Obviously, many modifications and variations of the invention are possible in the light of the above teachings. It is therefore to be understood that the invention may be practiced otherwise than as specifically described.

We claim:

1. An acoustic turbulent water flow tunnel for aiding in the isolation of a test section from pump and piping noises entering through structural or fluid paths, said tunnel comprising a closed loop having
  a motor, fluid clutch and pump system for providing a range of water velocities through such tunnel, said system being mounted on a concrete block
  a first plenum chamber having a plurality of neoprene screens,
  a first fire hose coupling the pump of said system and said chamber,
  a clear plastic pipe test section,
  a second fire hose connected to the aft end of said first plenum chamber,
  an elongate plastic pipe coupling the upstream end of said clear plastic pipe test section and said second fire hose,
  a second plenum chamber having a plurality of neoprene screens,
  a third fire hose coupling the downstream end of said clear plastic pipe test section and said second plenum chamber, and
  means coupling the downstream end of said second plenum chamber and said pump.

2. The combination of claim 1 wherein said means coupling said second plenum chamber and said pump includes a filter and a heat exchanger.

3. The combination of claim 1 wherein said elongate plastic pipe is cradled in a bed of sand.

4. The combination of claim 1 wherein said first plenum chamber carries five neoprene screens each having a multiplicity of holes, and said second plenum chamber carries three neoprene screens each having a multiplicity of holes.

References Cited

UNITED STATES PATENTS

| | | | |
|---|---|---|---|
| 2,382,999 | 8/1945 | Lee | 73—148 |
| 2,960,110 | 11/1960 | Levison | 181—35 XR |
| 3,333,465 | 8/1967 | Goodman et al. | 73—148 |

LOUIS R. PRINCE, Primary Examiner

JEFFREY NOLTON, Assistant Examiner

U.S. Cl. X.R.

181—35